United States Patent
Cheng et al.

(12) 
(10) Patent No.: US 6,412,315 B1
(45) Date of Patent: Jul. 2, 2002

(54) BOX HITCH RECEIVER LOCK

(76) Inventors: John C. Cheng; Calvin S. Wang, both of 14317 Don Julian Rd., Industry, CA (US) 91745

( * ) Notice: Subject to any disclaimer, the term of this patent is extended or adjusted under 35 U.S.C. 154(b) by 0 days.

(21) Appl. No.: 09/448,460

(22) Filed: Nov. 24, 1999

(51) Int. Cl.[7] ............................................. E05B 67/36
(52) U.S. Cl. ........................... 70/34; 70/258; 280/507
(58) Field of Search ............................ 70/14, 58, 34, 70/161, 258, 32, 229–232; 280/507

(56) References Cited

U.S. PATENT DOCUMENTS

| | | | | |
|---|---|---|---|---|
| 1,796,517 A | * | 3/1931 | Ganz | |
| 1,810,195 A | * | 6/1931 | Wharam | |
| 1,956,438 A | * | 4/1934 | Eichenauer | 70/183 |
| 2,677,261 A | * | 5/1954 | Jacobi | 70/14 |
| 4,428,211 A | * | 1/1984 | Hermann | 70/455 X |
| 4,640,106 A | * | 2/1987 | Derman | 70/14 |
| 4,711,106 A | * | 12/1987 | Johnson | 70/34 |
| 4,730,468 A | * | 3/1988 | Becker | 70/34 |
| 4,739,637 A | * | 4/1988 | Finkel et al. | 70/58 |
| 4,741,185 A | * | 5/1988 | Weinert et al. | 70/14 X |
| 5,119,653 A | * | 6/1992 | Mazzotta | 70/58 |
| 5,127,244 A | * | 7/1992 | Myers | 70/14 X |
| 5,241,846 A | * | 9/1993 | Hoke | 70/455 |
| 6,055,832 A | * | 5/2000 | Wyers | 70/18 X |

FOREIGN PATENT DOCUMENTS

| | | | | |
|---|---|---|---|---|
| DE | 372979 | * | 4/1923 | 70/34 |
| DE | 3049470 | * | 7/1982 | 280/507 |
| FR | 716436 | * | 12/1931 | 70/34 |
| FR | 2603935 | * | 3/1988 | 70/34 |
| FR | 2609944 | * | 7/1988 | 280/507 |
| GB | 1185746 | * | 3/1970 | 70/32 |
| GB | 1572792 | * | 8/1980 | 70/232 |

OTHER PUBLICATIONS

Dead–Bolt Hitch Lock, C.T. Johnson Enterprises, Sep. 1, 1985.*

* cited by examiner

Primary Examiner—Lloyd A. Gall
(74) Attorney, Agent, or Firm—Albert O. Cota

(57) ABSTRACT

A receiver lock for a trailer box hitch designed to secure a ball mount in place and protect it from unauthorized removal. The receiver lock consists of a solid metallic cylindrical pin (20) with a head (28) on one end and round end (40) on the other end. The pin includes a body (22) with a notched recess (32) essentially adjacent to the head with a bore (38) running through the head and body communicating with the recess. A cam lobe (42) is located within the recess and has a shape that conforms to the body when in an unlocked position, and extends above the body when locked. A circular keyway lock (48) is placed in the bore in the head and held captive with a set screw (50). A hexagonal lock connecting rod (56) joins the cam lobe to the lock through the bore. The invention functions by using the principle that when the lock is in the unlocked position the cam lobe is flush with the outside surface of the pin and insertable in the existing holes through both the box hitch and ball mount, and when in a locked position the cam is extended above the pin interfacing with the inside wall of the ball mount, thereby denying removal of the receiver lock and correspondingly the ball mount from the hitch.

14 Claims, 2 Drawing Sheets

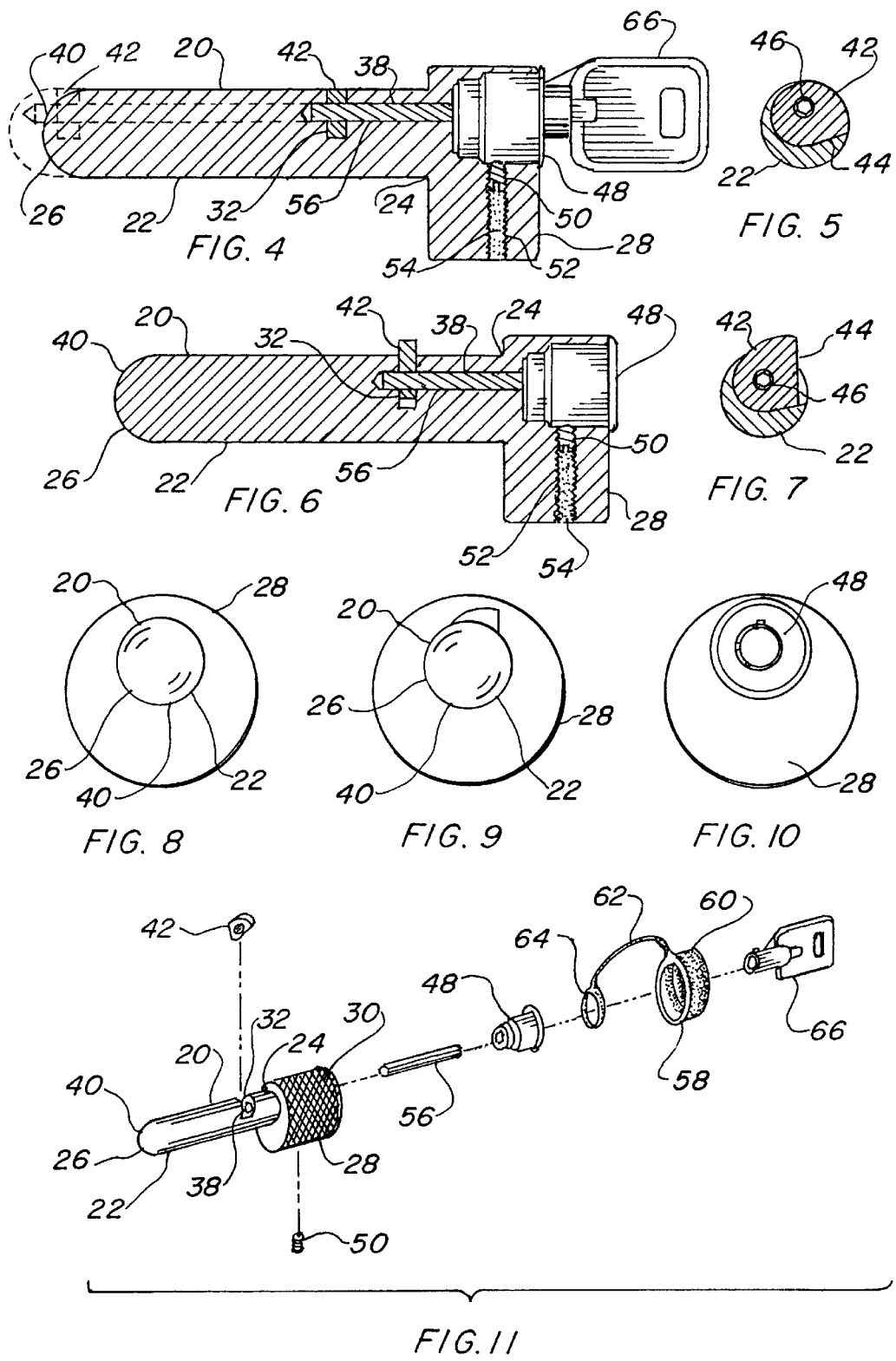

BOX HITCH RECEIVER LOCK

TECHNICAL FIELD

The invention relates to a receiver lock for a box hitch in general, and more specifically to an integral cam locking pin that replaces a conventional hitch pin and clip to prevent unauthorized removal.

BACKGROUND ART

Previously, many types of locks for hitches have been used to provide an effective means to protect a trailer that has been attached to a vehicle from unauthorized removal. Prior art has provided various dead bolt hitch locks that are made in two pieces which utilize a key to lock the parts together to make the closure. Other attempts to lock a trailer to a towing apparatus include padlocks, chains, cables and the like, or in the case of a large trailer attached with a fifth wheel, a hitch lock is used on a coupler surrounding a pin which excludes attachment by a vehicle.

A search of the prior art did not disclose any patents that read directly on the claims of the instant invention, however the following U. S. patents are considered related:

| Pat. No.  | Inventor       | Issue Date    |
|-----------|----------------|---------------|
| 5,937,679 | Villalon, Jr.  | Aug. 17, 1999 |
| 5,735,539 | Kravitz        | Apr. 7, 1998  |
| 5,632,501 | Jackson, et al | May 27, 1997  |
| 5,441,295 | Smith          | Aug. 15, 1995 |
| 4,730,468 | Becker         | Mar. 5, 1988  |

Villalon, Jr. in U.S. Pat. No. 5,937,679 teaches an anti-theft device for a trailer coupler which covers a receptacle to a coupler, thus preventing insertion of a hitch ball or other towing means. Locking is achieved by using a retaining member and a lock housed in the body of the device. A second embodiment includes a lever independent of the retaining member held in place with a lock.

Kravitz in U.S. Pat. No. 5,735,539 teaches a trailer hitch locking device using a connection tightening mechanism with a bridge element, and a spaced pair of flanges secured to a projection from the bridge element. The elements straddle one of the components and as the flanges are connected to the components they engage a different component thereby tightening a telescopic connection.

U.S. Pat. No. 5,632,501 of Jackson is for a self-latching trailer coupler for use with a ball head post. The coupler includes a housing having a receiving socket with a latching member within the rear of the housing and is adapted to move between a latched and unlatched position. The latch member is guided along a path using guide pins and slots, and downward force automatically rotates the latch to an engaged position. A self-actuated locking device is provided for locking the latching member, and a locking lever is used for releasing the device.

Smith discloses in U.S. Pat. No. 5,441,395 a hitch lock assembly that is attached to a trailer hitch. The lock uses a pair of lock pin members operable with a padlock member to provide means for securing the hitch bail latch to the ball. Each lock pin is of steel rod construction and has a vertical section mountable within aligned holes in the hitch housing. The padlock member is removed from the interconnected lock pin to achieve an unlatched condition.

U.S. Pat. No. 4,730,468 issued to Becker is for an anti-theft device for semi-trailers using a cylindrical landing gear. A pin with an elongated head is inserted through a hole in the landing gear and is comprised of a cog that extends outward from a pin that is attached through the center of the pin to a circular keyway lock. When the cog is rotated outward, as rotated by the lock, the pin cannot be removed from the hole, therefore leaving the landing gear extended, and thereby preventing removal of the trailer by a semi-truck tractor.

For background purposes and as indicative of the art to which the invention is related reference may be made to the remaining citing issued to Sanders in U.S. Pat. No. 5,344,174.

DISCLOSURE OF THE INVENTION

The use of trailer hitches on vehicles such as automobiles, pick-up trucks and light utility vehicles has increased in popularity over the years and has been readily accepted specifically with the utilization of a hitch with a box-end receiver. The advantages of a box-end hitch permits hitches to be added to a vehicle using aftermarket equipment, and the fact that the design permits a ball mount to be removable is extremely advantageous as it does not leave the hitch extending beyond the bumper when not in use. The ball mount is installed by simply sliding its square shank into a rectangular opening in the box end hitch and it is held in place with a hitch pin, which is usually a rod beveled on one end with the other end bent in an L-shape. A pair of holes are aligned in both the hitch and the ball mount which allows the hitch pin to be inserted and then retained with a hairpin clip.

Since this box-end hitch system is efficient and has been in use almost universally, the primary object of the invention is to replace the L-shape pin with a key actuated locking pin that when secured in place prevents removal of the ball mount entirely and the trailer attached thereto. Attempts in the past for this type of replacement pin have used two separate parts that operate satisfactorily, however they are subject to loss or misplacement and require alignment and manual manipulation to install.

An important object of the invention is that the locking pin is installable with one hand as the pin is simply inserted in the aligned holes in the hitch and ball mount and the key is rotated and removed.

Another object of the invention is the fact that no tools are required to install the pin as is the case with mechanical fasteners used in conjunction with padlocks and the like.

Still another object of the invention is that the pin is extremely secure, as it is difficult to breach the lock's integrity since the pin is constructed of a solid piece of hardened tool steel and only the head of the pin and the outside end of the lock are visible when installed. The lock itself is secured to the pin with a set screw and the set screw access hole is filled with epoxy; further, its position is almost inaccessible when the pin is installed.

Yet another object of the invention is that the pin has a rounded end for ease of insertion into the mating holes without visual communication. The operator may reach under the vehicle and by feel insert the pin into the holes since the shape permits the pin to self align.

A further object of the invention is that the lock is protected by a resilient protective cap, thus preventing the lock from freezing, moisture, rust, corrosion, or clogging with debris when in use. This feature is important as the pin is under the vehicle and continuously subjected to the road environment with its frequent hazards. The protective cap is made of a resilient thermoplastic and as such its sheath fits a knurled head of the pin tightly. The sheath of the cap is held captive by a tether attached to a keeper ring that is placed over the pin adjacent to the head. This keeper ring also prevents the pin from rattling between the head and the hitch.

A final object of the invention is the fact that it fits all class II and class III hitches with a 2 inch receiver since the pin diameter and length complies with the industry standard hitch configuration.

These and other objects and advantages of the present invention will become apparent from the subsequent detailed description of the preferred embodiment and the appended claims taken in conjunction with the accompanying drawings.

BRIEF DESCRIPTION OF THE DRAWINGS

FIG. 4 is a cross-sectional view taken along lines 4—4 of FIG. 2 illustrating the internal components of the lock in the unlocked condition.

FIG. 5 is a full and complete cross-sectional view taken along lines 5—5 of FIG. 2 showing the cam in the closed position.

FIG. 6 is a cross-sectional view taken along lines 6—6 of FIG. 3 illustrating the internal components of the lock in the locked condition.

FIG. 7 is a full and complete cross-sectional view taken along lines 7—7 of FIG. 3 showing the cam in the rotated open or locked position.

FIG. 8 is a left end view of the preferred embodiment in the unlocked position.

FIG. 9 is a left end view of the preferred embodiment in the locked position.

FIG. 10 is a right end view of the preferred embodiment.

FIG. 11 is an exploded view of the preferred embodiment.

BEST MODE FOR CARRYING OUT THE INVENTION

Figure 1:
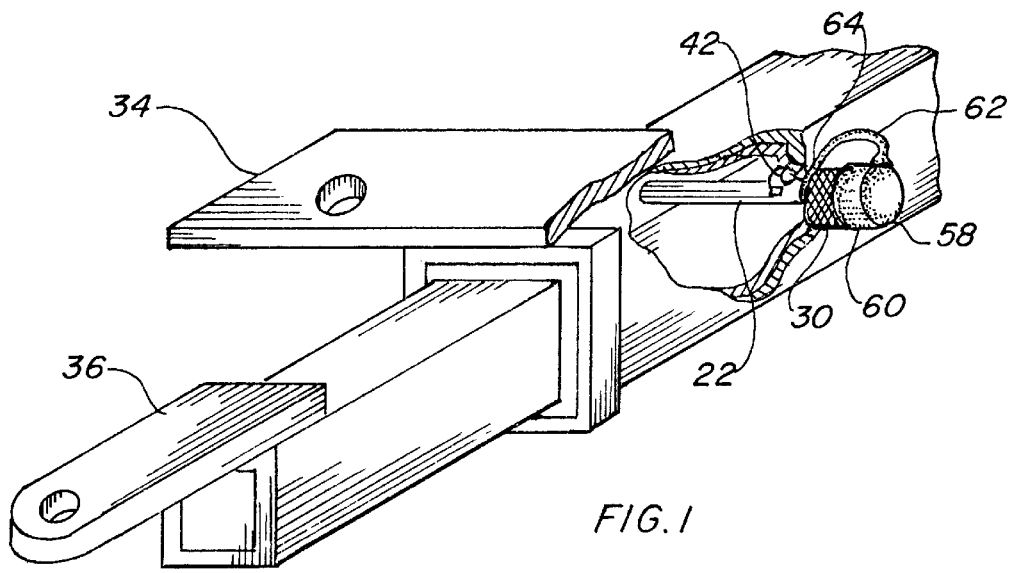
FIG. 1 is a partial isometric view of the preferred embodiment installed in a exemplary vehicle class III bumper attached box hitch with a ball mount inserted therein. The ball mount is shown less the ball. Further, the receiver is cut away to illustrate the position of the lock with the cam rotated in the locked condition, the key removed and the protective cover installed.

The best mode for carrying out the invention is presented in terms of a preferred embodiment for a box hitch receiver lock. This preferred embodiment is shown in FIGS. 1 through 11 and is comprised of a solid pin 20 that includes a cylindrical body 22 having a first end 24 and a second end 26. The first end 24 has an integral head 28 that is eccentric to the body 22 as shown in FIGS. 2–4, 6 and 8–11. The head 28 may be knurled 30 on an outside surface for ease of handling and gripping. The pin 20 further includes a notched recess 32 in the body 22 essentially adjacent to the head 28 as best shown in FIGS. 2–7 and 11. The primary reason for the location of the recess 32 is the actual thickness of the box hitch 34 combined with the thickness of the wall of the ball mount 36 as depicted in FIG. 1, the location of the recess 32 controls the interfacing locking position on an inside surface of the ball mount 36 and as such is important. It should be noted that in another embodiment it is possible to locate the recess 32 essentially adjacent to the solid pin second end 26, as illustrated in dotted lines in FIGS. 2 and 4. In this embodiment the physical location near the end of the pin 20 permits interfacing with an outside surface of the trailer hitch receiver 34.

A bore 38 is located through the head 28 and body 22 continuing through and terminating just beyond the recess 32. This bore 38 is stepped larger on the head end and is smaller through the body portion and continues with the same smaller diameter just beyond the recess 32. The bore 38, as illustrated best in FIGS. 4 and 6, is round and is not concentric with either the head 28 or body 22. While the bore 38 is shown on the upper portion of the body 22 in the drawings its position may be relocated in any plane as long as it is not concentric with the body 22, and still may fall within the scope of the invention.

The pin 20 has a length that is governed by the configuration of the box hitch 34 since it is dimensioned to extend just beyond the outside surface of the hitch as illustrated in FIG. 1. While the overall length of the body 22 is not particularly important it must protrude sufficiently from the hitch to lock the ball mount 36 securely in place. The second end 26 of the pin 20 is round 40 or has a full radius from the body 22 as shown in FIGS. 2–4, 6 and 11, which permits the pin to be easily inserted into existing holes in the hitch and ball mount. While round is preferred, other shapes are acceptable such as a cone, truncated end, oval etc. It has been found that hardened tool steel is an ideal material for the pin 20, however, other materials may be used with equal ease and dispatch. Plating or other surface treatment may also be added to protect the pin from corrosion, wear or other types of exterior deterioration.

Figure 2:
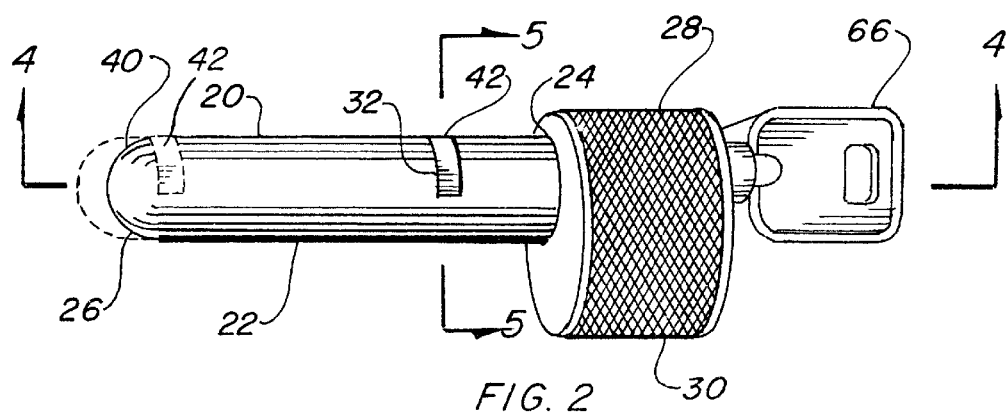
FIG. 2 is a partial isometric view of the preferred embodiment with the cam in the closed position and the key inserted.
Figure 3:
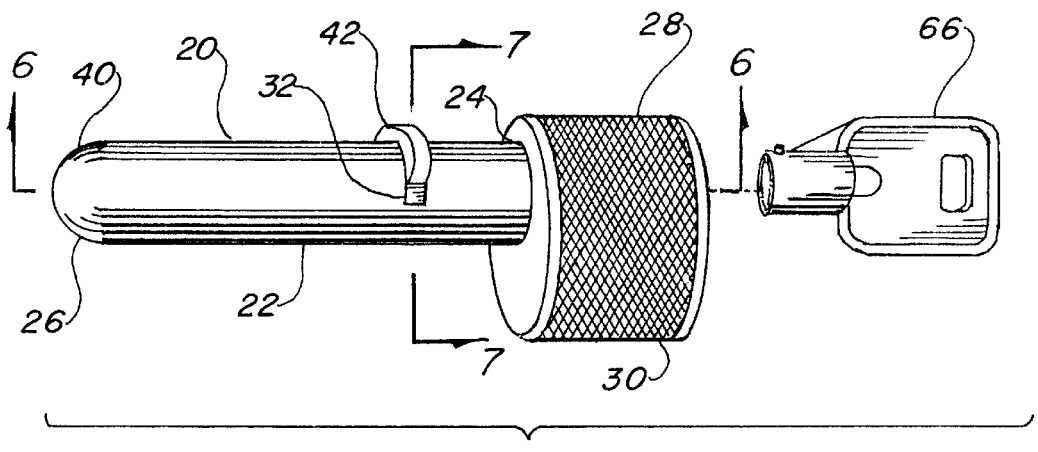
FIG. 3 is a partial isometric view of the preferred embodiment with the cam in the open position and the key removed.

An eccentric cam lobe 42 is loosely disposed within the recess 32 within the body 22 of the pin 20 and has a shape conforming basically to the configuration of the recess 32 and outside surface of the body 22 except it is somewhat eccentric having a flat 44 on one side as illustrated in FIGS. 5 and 7. The cam lobe 42 further includes a hexagonal hole 46 therethrough basically in the radial center. The lobe 42 is made of a structurally sound material such as hardened tool steel or other hardened material as the locking strength is achieved by only a portion of the lobe that protrudes above the surface of the pin body 22 and intersects with the inside surface of the ball mount 36, thus preventing removal of the device from the hitch. The lobe 42, as shown in FIGS. 2 and 4, may also be located adjacent to the solid pin second end 26 for lockably interfacing with the outside surface of the trailer box hitch receiver.

A high security circular keyway lock 48 is disposed within the bore 38 of the head 28 of the pin 20 as shown in FIGS. 4 and 6. This preferred lock 48 is well known in the industry and usually contains at least a 7 pin tumbler, however it should not be limited to this particular type, as any lock of a similar configuration may be used; for example, a lock operated by a straight key. Means to retain the lock 48 within the head 28 of the pin 20 are in the form of a set screw 50, which is located in a threaded hole 52 in the head 28, as shown in FIGS. 4 and 6. The threaded hole 52 may be at any position around the lock 48, however directly below is shown for convenience in the drawings. If desired, a structural filler such an epoxy 54 may be added to the hole 52 to prevent removal of the set screw 50. It should be noted that the set screw 50 impinges directly on the body of the lock 48 in such a manner that it holds the lock 48 securely in place by tension and also into a groove or recess in the lock's body.

A lock connecting rod 56 is positioned within the remaining smaller diameter portion of the bore 38 and joins the eccentric cam lobe 42 to the circular keyway lock 48. The connecting rod 56 is preferably hexagonal in shape to interface with the hexagonal hole 46 in the cam lobe 42 and the lock 48. The hole 46 in the cam lobe 42 is sufficiently large to permit the connecting rod 56 to slide freely therethrough and into the continuing bore on the opposite side as depicted in FIGS. 4 and 6. While the hexagonal shape is preferred, any polygonal shape may be used or even round with raised crimps to permit a pressed fit with the lobe and lock.

In order to protect the invention from environmental deleterious effects, a resilient protective cap 58 is added to the pin 20 over the head 28 and includes a tightly fitting sheath 60 that is connected with an integral tether 62 to a integral keeper ring 64 as shown in FIGS. 1 and 11. The keeper ring slips over the pin body 22 and is flush with or only slightly compressed between the head 28 and the box hitch 34 when the device is installed. The sheath 60 is slipped over the head 28 and is held captive as the material of the cap 58 is preferably formed of a pliable thermoplastic.

It should be noted that the keyway lock 48 includes a key 66 that is captive within the lock when the lock is in an unlocked position and is removable only when the lock is in a locked position, thereby precluding separating and loss of the key when the invention is unlocked and removed when not in use.

During use, the ball mount 36 is inserted into the box hitch 34 with the existing holes for the conventional hitch pin aligned, and the invention is then inserted into the holes by hand. The operator then turns the key 66 and the cam lobe 42 rotates to interface with the inside surface of the ball mount, thus preventing withdrawal of the pin 20. The key 66 may then be removed and the pin 20 is securely locked in place. The protective cap 58 is then slipped over the head 28 of the pin 20 to cover the keyway. When removal is required the cap 58 is removed and the key 66 inserted and the invention functions in reverse of the installation. Again the key 66 is retained in the lock 48 until the pin 20 is used again.

While the invention has been described in complete detail and pictorially shown in the accompanying drawings, it is not to be limited to such details, since many changes and modifications may be made in the invention without departing from the spirit and scope thereof Hence, it is described to cover any and all modifications and forms which may come within the language and scope of the appended claims.

What is claimed is:

1. A trailer box hitch receiver lock for securing a ball mount in a trailer receiver hitch comprising:
   a) a solid pin having a cylindrical body with a first end and a second end with the first end having an integral head, said pin further having a notched recess in the body and a bore through the head and body communicating with the recess, with said bore enlarged through the head,
   b) an eccentric cam lobe, disposed within the recess having a shape conforming to the pin cylindrical body in an unlocked position and extending above the pin when rotated into a locked position,
   c) a high security circular keyway lock disposed completely within the enlarged portion of the bore in the head of the pin, and
   d) a lock connecting rod joining the eccentric cam lobe to the lock through the bore such that when the lock is in the unlocked position the cam lobe is flush with an outside surface of the pin and in a locked position the cam lobe is extended above the pin on an inside wall of the ball mount within the receiver hitch denying removal of the receiver lock and correspondingly the ball mount from the hitch wherein said head of the cylindrical pin is eccentric with the bore that receives the lock and the connecting rod.

2. The box hitch receiver lock as recited in claim 1 wherein said cam lobe is essentially adjacent to the solid pin head for lockably interfacing with an inside surface of the ball mount.

3. The box hitch receiver lock as recited in claim 1 wherein said cam lobe is essentially adjacent to the solid pin second end for lockably interfacing with an outside surface of the trailer box hitch receiver.

4. The box hitch receiver lock as recited in claim 1 wherein said solid cylindrical pin second end is rounded and of a length such that when positioned within a box hitch the head is contiguous with the box hitch, the second end extends beyond the box hitch's outside surface.

5. The box hitch receiver lock as recited in claim 1 wherein said eccentric head is knurled on an outside surface for ease of handling.

6. The box hitch receiver lock as recited in claim 1 wherein said solid pin is hardened tool steel.

7. The box hitch receiver lock as recited in claim 1 wherein said cam lobe further comprises said lobe having a hexagonal hole therethrough for receiving the lock connecting rod.

8. The box hitch receiver lock as recited in claim 1 wherein said cam lobe is hardened tool steel.

9. The box hitch receiver lock as recited in claim 1 wherein said lock further having a key that is captive within the lock when in an unlocked position and is removable only when in a locked position, precluding separating and loss of the key when the receiver lock is removed when not in use.

10. The box hitch receiver lock as recited in claim 1 further comprising means to retain the lock within the head of the pin.

11. The box hitch receiver lock as recited in claim 10 wherein said means to retain the lock within the head of the pin further comprises said head having a threaded hole in alignment with the lock and a set screw threadably disposed within the threaded hole, thereby pressing against the lock to hold the lock securely in place in the bore of the pin.

12. The box hitch receiver lock as recited in claim 1 wherein said lock connecting rod is in a hexagonal shape for co-operatively interfacing with the cam lobe and lock.

13. The box hitch receiver lock as recited in claim 1 further comprising a resilient protective cap having a tightly fitting cap sheath for covering the head of the pin to exclude any environmental deleterious effects.

14. The box hitch receiver lock as recited in claim 13 wherein said resilient protective cap is formed of a pliable thermoplastic and configured to include an integral keeper ring for positioning over the pin body and a sheath for slipping over the head of the pin further an integral tether connecting the ring to the cap sheath.

* * * * *